Figure 2:
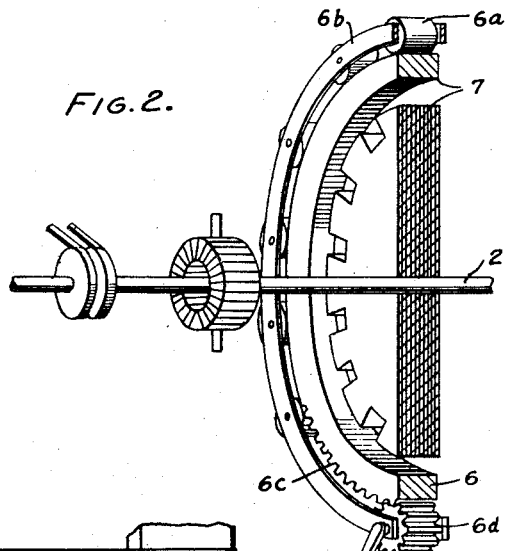

Patented May 10, 1949

2,469,662

UNITED STATES PATENT OFFICE 2,469,662

DYNAMOELECTRIC MACHINE

Cecil William Haviland Minchin, Dursley, England, assignor to Mawdsley's Limited, Dursley, England, a company of Great Britain Application December 3, 1946, Serial No. 713,804
In Great Britain March 29, 1946

6 Claims. (Cl. 322—59)

1

This invention relates to self-excited alternating current dynamo electric machines and more particularly to machines which have compensating devices, for example, to control the terminal voltage of a self-excited alternator or the power factor of a self-excited synchronous motor.

Such a machine is described and illustrated in our co-pending application No. 570,612, dated December 30, 1944, now Patent No. 2,431,067, issued November 18, 1947.

Such a self-excited machine has an armature which rotates between stationary field magnet poles and is provided with two separate windings, namely (1) an alternating current winding connected to slip rings and (2) a direct current winding connected to a commutator. The poles are excited by a field winding connected to the commutator brushes and the alternating terminal voltage output is generally controlled by the adjustment of a field rheostat which is connected in series with the field winding. With constant setting of the field rheostat and constant speed the terminal output voltage of the alternator will fall with increasing load, this phenomenon being more pronounced when the load current is at low lagging power factor than when at nearer unity or leading power factor.

The reason for this drop in terminal output voltage is due chiefly to the magneto-motive force of armature reaction causing distortion of and opposing the magneto-motive force of the field poles. When the alternator is loaded at unity power factor the M. M. F. of the armature reaction is nearly at ninety electrical degrees to the M. M. F. of the field poles. This leads to distortion of the main field and results in a small drop in terminal output voltage. When the alternator is loaded at zero lagging power factor the M. M. F. of armature reaction is nearly in direct opposition to the M. M. F. of the field poles. This leads to considerable decrease in total M. M. F. and a greater drop in terminal output voltage.

If the terminal voltage is to be kept constant at constant speed then the direct current excitation must be increased with either increasing load at given power factor or with decreasing lagging power factor at a given load.

It is the object of the present invention to provide means by which at constant speed the direct current excitation of an alternator of this type will be automatically varied so that the terminal output voltage of the alternator will be maintained substantially constant over a wide range of load and power factor without adjustment of a field rheostat.

2

According to the present invention a self-excited alternating current dynamo electric machine comprises a main armature and field magnets, an alternating current winding and a direct current winding on the armature, a second armature fixed relatively to the main armature, a continuous unwound member of magnetic material arranged with a radial air gap in relation to said second armature, an alternating current winding on the second armature arranged for the same number of phases and poles as and connected in series with that on the main armature, a direct current winding on the second armature which is independent of that on the main armature, and separate commutators connected each to its respective direct current winding, the brushes of which are connected to independent windings on the field magnets.

Preferably, a rheostat is connected in the circuit of the field winding which is supplied from the direct current winding on the main armature.

Figure 1:
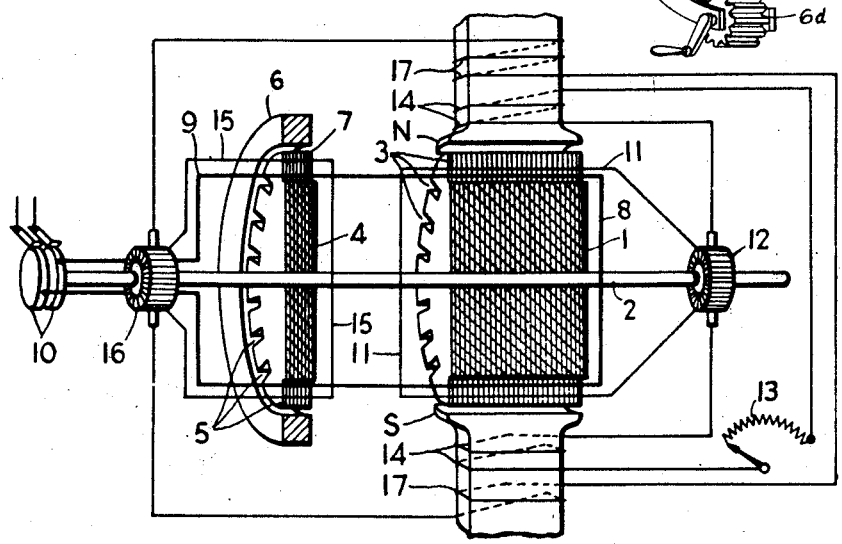

In order that the invention may be more clearly understood, a preferred construction will now be described with reference to the accompanying drawings in which Fig. 1 shows, in cross-sectional perspective, a schematic arrangement of machine in accordance with the invention, and Fig. 2 is a fragmentary view illustrating a modification of a part of the machine shown in Fig. 1.

In Fig. 1, 1 is the main rotating armature fixed on a shaft 2 to rotate between the field magnet poles S, N. One pair of field magnet poles are indicated but a machine may have more than one pair depending on its characteristics as will be understood. The armature has the usual slots 3 to accommodate the windings. A second armature 4 having slots 5 is also fixed on the shaft 2 close to the armature 1. The number of slots is preferably the same as that of the armature 1. The armature 4 rotates within a stationary continuous unwound member of magnetic material 6 from which it is separated by a small even radial gap 7. 8 indicates the alternating current winding of the alternator wound in the slots 3 of the armature 1. It is of usual form and is connected to a similar winding 9 arranged for the same number of phases and poles as the winding 8 wound in the slots 5 of the second armature 4 so that the two windings are in series. Each side of a coil wound in the slots 5 may be an extension of a side of a coil wound in the slots 3. The ends of the two windings are brought out to the slip rings 10. As the second armature 4 is entirely separated magnetically from the field magnet poles S, N of the main armature 1, when the alternator is supplying current at any given power factor and load the winding on the armature 4 produces a magnetic field which is stationary in space and the M. M. F. producing this field is in direct proportion to the alternating current flowing in the winding. The magnetic circuit of this second armature 4 and its unwound member 6 is so proportioned that very little magnetic saturation occurs and consequently the strength of the magnetic flux in this second field system is almost directly proportional to the load current of the alternator.

When the alternator is loaded at zero lagging power factor the direction of the magnetic flux in the second armature 4 will be almost in direct opposition to the direction of the magnetic flux produced by the main field magnets S, N.

The direct current winding of the main armature 1 is indicated at 11 and is also wound in the slots 3. It is connected to a commutator 12, the brushes of which are connected through a rheostat 13 to a first field winding 14 on the poles N, S. The direct current winding 15 on the auxiliary armature is connected to another commutator 16, the brushes of which are connected to a second field winding 17 on the poles N, S. The machine operates as follows:

The voltage picked up from the D. C. winding 11 on the main armature 1 is nearly constant for all loads, but the voltage picked up from the commutator associated with the independent D. C. winding on the second armature varies with load, and is zero when there is no A. C. output. It increases, however, both as the A. C. load increases and also as it decreases with lagging power factor.

By suitable selection of the resistance value of the two separate field windings, the machine may be made to maintain its A. C. output voltage substantially constant over all loads within its working range. The construction is, however, especially useful in single phase alternators where the voltage generated in the D. C. winding on the auxiliary armature is pulsating in character and is therefore liable to cause sparking at the commutator. By the use of an independent D. C. winding on the auxiliary armature a low voltage can be employed for the excitation of the additional windings on the field magnets N, S, thus reducing considerably the difficulties due to sparking at the commutator.

In a modified construction shown in Fig. 2, the radial air gap 7 between the unwound stator member 6 and the second armature 4 is varied, in length around the inner periphery of the said stator by variation of the radius thereof in order to vary the degree of compensation at a given power factor or to assist commutation. Provision is made for the rotation of the stator 6 about the axis of the shaft 2 in order to vary the points in space at which the maximum and minimum air gaps occur. Thus for example the stator may be mounted (as shown) on circumferentially arranged rollers 6a in a frame 6b and its rotation may be effected manually through gearing 6c, 6d.

It is a further advantage of the construction according to the invention that standard D. C. armature windings can be used on each of the two armatures, and can be connected in the usual way to their own commutators. It is further of use in the construction of a machine which is required to give a D. C. output at any particular voltage or current from the main armature D. C. winding, or for a machine which must run as a motor for engine starting or other purposes as well as running as an alternator or synchronous motor.

What I claim is:

1. A self-excited alternating current dynamo electric machine comprising a main armature and field magnets, an alternating current winding and a direct current winding on the armature, a second armature fixed relatively to the main armature, a continuous unwound member of magnetic material arranged with a radial air gap in relation to said second armature, an alternating current winding on the second armature arranged for the same number of phases and poles as and connected in series with that on the main armature, a direct current winding on the second armature which is independent of that on the main armature, separate commutators connected each to its respective direct current winding, a set of brushes on each commutator, a winding on the field magnets connected to one set of brushes and a second winding on the field magnets connected to the other set of brushes.

2. A self-excited alternating current dynamo electric machine comprising a main armature and field magnets, an alternating current winding and a direct current winding on the armature, a second armature fixed relatively to the main armature, a stationary continuous unwound member of magnetic material arranged with a radial air gap in relation to said second armature, an alternating current winding on the second armature arranged for the same number of phases and poles as and connected in series with that on the main armature, a direct curernt winding on the second armature, which is independent of that on the main armature, separate commutators connected each to its respective direct current winding, a set of brushes on each commutator, a winding on the field magnets connected to one set of brushes and a second winding on the field magnets connected to the other set of brushes.

3. A self-excited alternating current dynamo electric machine comprising a main armature and field magnets, an alternating current winding and a direct current winding on the armature, a second armature fixed relatively to the main armature, a continuous unwound member of magnetic material arranged with a radial air gap in relation to said second armature, the said unwound member and the said second armature being so proportioned that little magnetic saturation occurs, an alternating current winding on the second armature arranged for the same number of phases and poles as and connected in series with that on the main armature, a direct current winding on the second armature which is independent of that on the main armature, separate commutators connected each to its respective direct current winding, a set of brushes on each commutator, a winding on the field magnets connected to one set of brushes and a second winding on the field magnets connected to the other set of brushes.

4. A self-excited alternating current dynamo electric machine according to claim 6, characterised by the fact that the continuous unwound member of magnetic material is angularly adjustable to vary the air gap existing at any point between the inner periphery of the unwound member and the second armature.

5. A self-excited alternating current dynamo electric machine comprising a main armature and field magnets, an alternating current winding and a direct current winding on the armature, a second armature fixed relatively to the main armature, a continuous unwound member of magnetic material arranged in relation to said second armature to provide a radial air gap of constant width, an alternating current winding on the second armature arranged for the same number of phases and poles as and connected in series with that on the main armature, a direct current winding on the second armature which is independent of that on the main armature, separate commutators connected each to its respective direct current winding, a set of brushes on each commutator, a winding on the field magnets connected to one set of brushes and a second winding on the field magnets connected to the other set of brushes.

6. A self-excited alternating current dynamo electric machine comprising a main armature and field magnets, an alternating current winding and a direct current winding on the armature, a second armature fixed relatively to the main armature, a continuous unwound member of magnetic material arranged in relation to said second armature to provide a radial air gap of varying width, an alternating current winding on the second armature arranged for the same number of phases and poles as and connected in series with that on the main armature, a direct current winding on the second armature which is independent of that on the main armature, separate commutators connected each to its respective direct current winding, a set of brushes on each commutator, a winding on the field magnets connected to one set of brushes and a second winding on the field magnets connected to the other set of brushes.

CECIL WILLIAM HAVILAND MINCHIN.

REFERENCES CITED

The following references are of record in the file of this patent:

UNITED STATES PATENTS

| Number | Name | Date |
|---|---|---|
| 431,235 | Shallenberger | July 1, 1880 |
| 1,646,821 | Karapetoff | Oct. 25, 1927 |